3 Sheets—Sheet 1.

T. S. HARRISON & T. H. SAVERY.
DRYING-APPARATUS.

No. 176,628. Patented April 25, 1876.

Witnesses:
W. R. Wright
O. C. Brainbridge

Inventors:
Thomas S. Harrison
Thomas H. Savery
by J. Bonsall Taylor, Attorney.

3 Sheets—Sheet 2.
T. S. HARRISON & T. H. SAVERY.
DRYING-APPARATUS.
No. 176,628. Patented April 25, 1876.
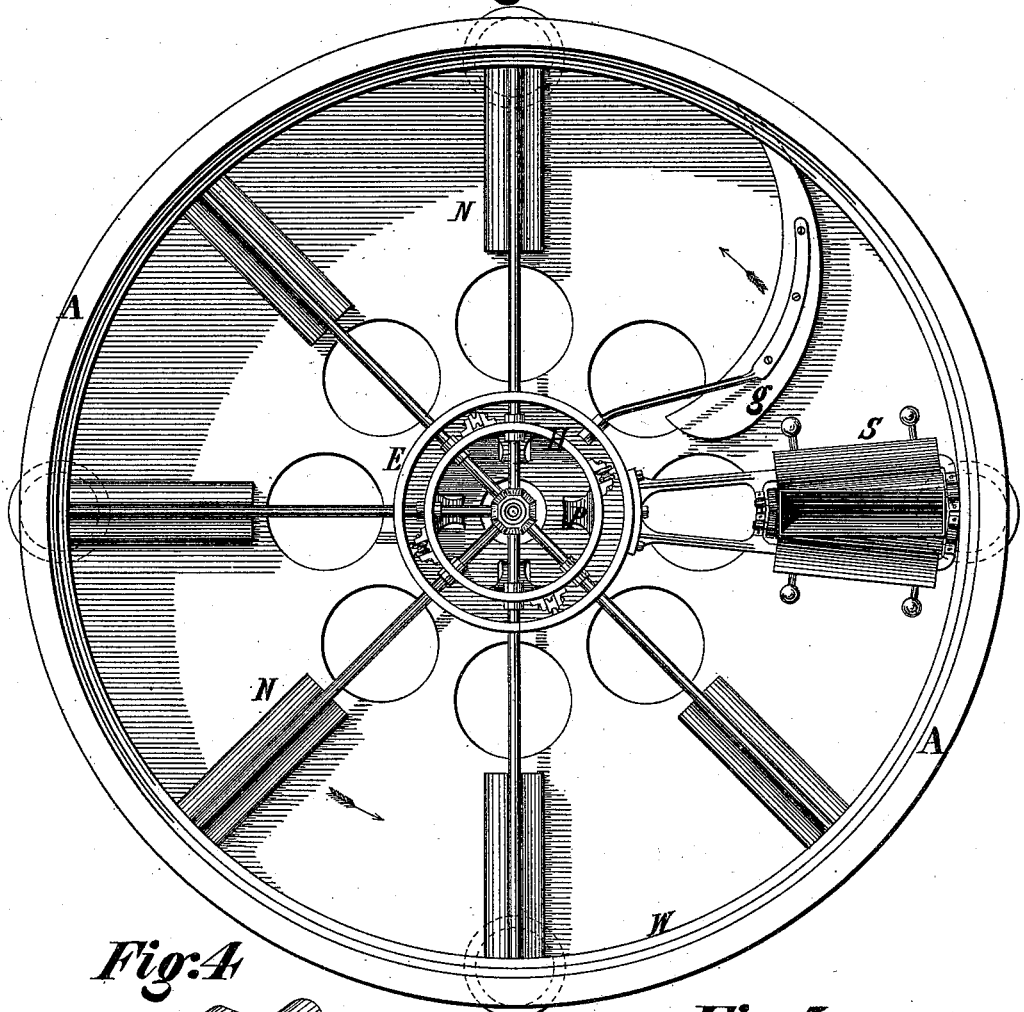
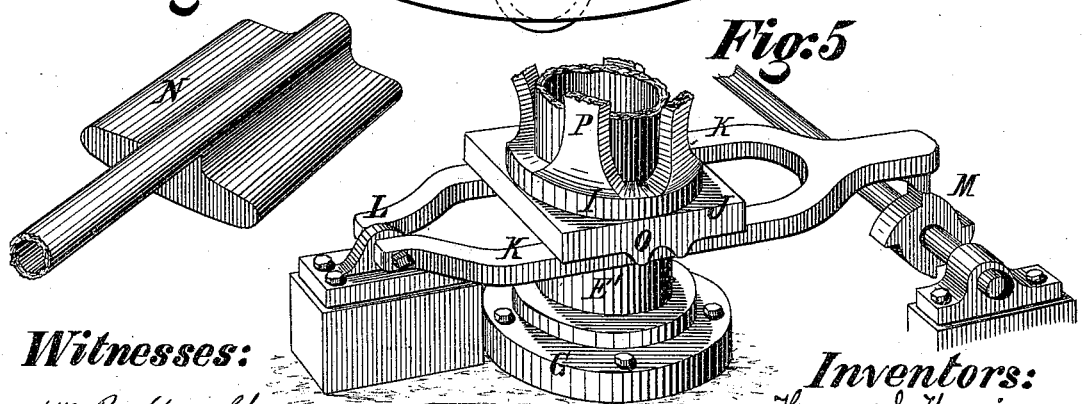
Witnesses:
W. R. Wright
C. C. Brawbridge
Inventors:
Thomas S. Harrison
Thomas H. Savery
by J. Bonsall Taylor Attorney 3 Sheets—Sheet 3.

T. S. HARRISON & T. H. SAVERY.
DRYING-APPARATUS.

No. 176,628. Patented April 25, 1876.

Witnesses:
W. R. Wright
W. C. Strawbridge

Inventors:
Thomas S. Harrison
Thomas H. Savery
by J. Bonsall Taylor
Attorney.

N. PETERS, PHOTO-LITHOGRAPHER, WASHINGTON, D. C.

UNITED STATES PATENT OFFICE.

THOMAS S. HARRISON, OF PHILADELPHIA, PENNSYLVANIA, AND THOMAS H. SAVERY, OF WILMINGTON, DELAWARE.

IMPROVEMENT IN DRYING APPARATUS.

Specification forming part of Letters Patent No. 176,628, dated April 25, 1876; application filed February 12, 1876.

*To all whom it may concern:*

Be it known that we, THOMAS S. HARRISON, of the city of Philadelphia and State of Pennsylvania, and THOMAS H. SAVERY, of the city of Wilmington and the State of Delaware, have invented certain new and useful Improvements upon the Drying Apparatus for which Letters Patent of the United States were granted to us upon the 17th day of November, A. D. 1874, and numbered 156,849, in connection with which Letters Patent the following specification, declared by us to be a full, clear, and precise description of our improvements, is to be understood.

Similar letters of reference indicate corresponding parts in all the drawings, of which—

Figures 1, 2:
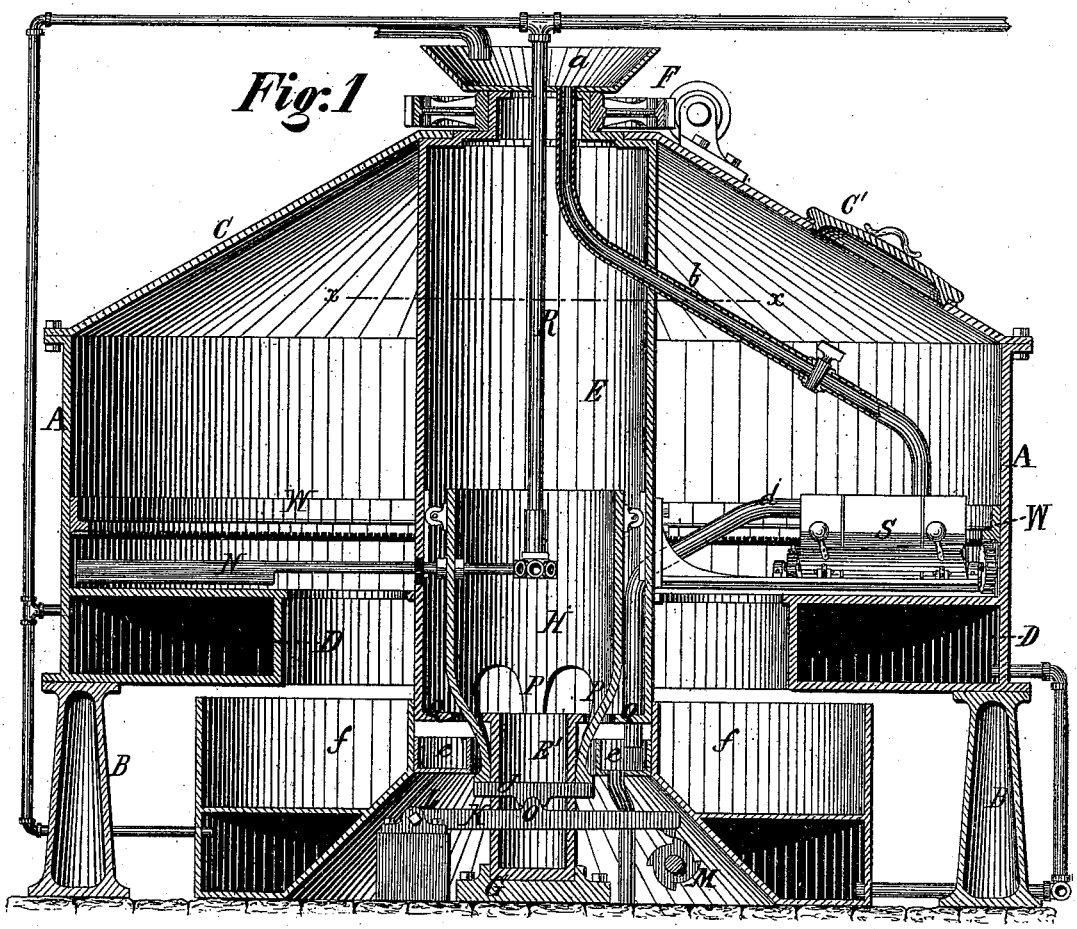
Figure 6:
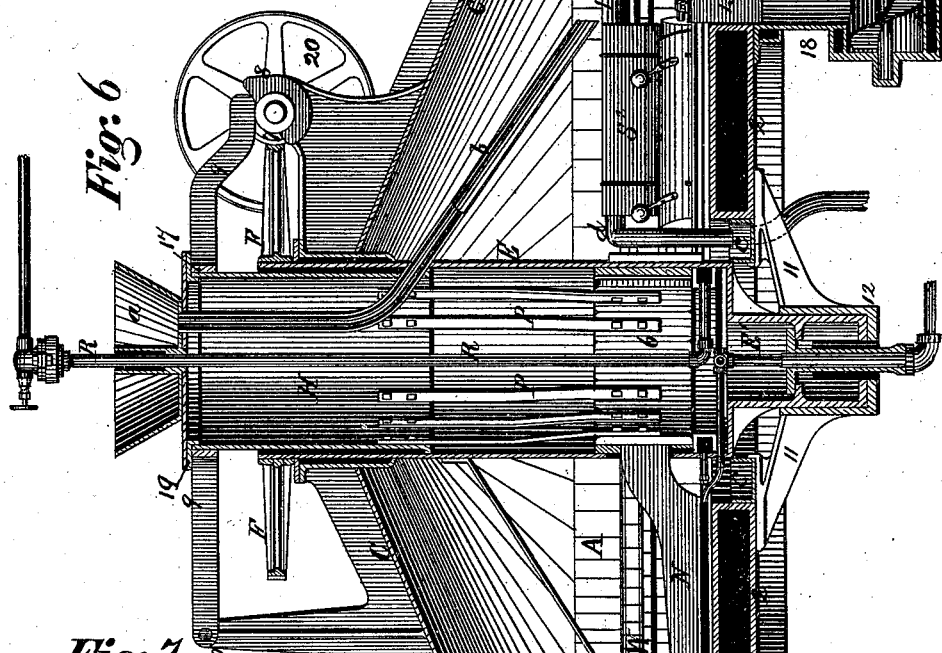
Figure 7:
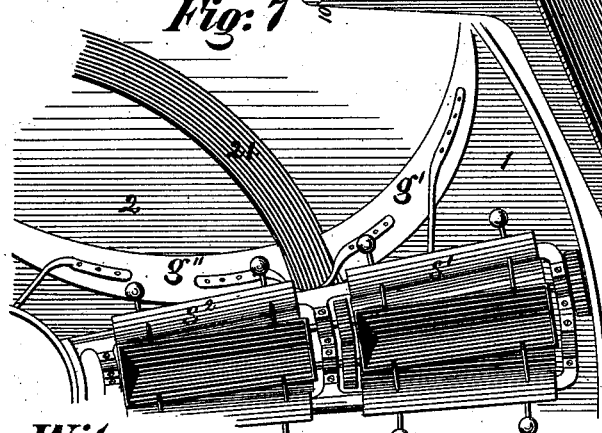

Figure 1 is a central sectional elevation of one form of our improvement; Fig. 2, a perspective of the automatic-feeding apparatus; Fig. 3, a plan of the platform of the drier represented in Fig. 1, with the cover-plate removed, showing the pounding-arms, the feed apparatus, and scraper, carried by the central shaft, and the shaft itself, in section on the line *x x* of the former figure; Fig. 4, a perspective of a convenient form of pounding-arm; Fig. 5, a perspective of the mechanism represented in Fig. 1 for imparting a lifting and dropping motion to either the central shaft or the pounding-arms; Fig. 6, a central sectional elevation of that form of our drier which has the greatest effective capacity, showing the pan-sweeper and discharging-conveyer, and a combined form of lifting and dropping and rotating mechanism located at the top; Fig. 7, a partial plan of the platform of the foregoing form of drier, showing the duplex arrangement of the scraper and feed apparatus; and Fig. 8, an elevation of the irregular worm-wheel, hereinafter described.

The drawings represent a one-platform or single drier.

Our improvements consist, first, in imparting to the central shaft, by any convenient mechanism, a motion of intermittent or non-continuous rotation.

They further consist in imparting to a central rotating shaft, when it carries rigidly attached to it a series of pounding arms or sleds, by any convenient mechanism, a lifting and dropping motion, whereby the arms or sleds are lifted from and dropped upon the platform, or else, in imparting to a series of pounding arms or sleds, rotated by, but not attached to, the central shaft, or rotated by and attached to any convenient mechanism, a lifting and dropping motion.

They further consist in imparting to the central shaft, when it carries rigidly attached to it a series of pounding arms or sleds, by any convenient mechanism, a motion of intermittent rotation, together with a lifting and dropping motion, whereby the arms or sleds are intermittently stopped and allowed to bear their weight, and intermittently also lifted and dropped upon the platform, the relative times of the two motions being made correspondent, the stop simultaneous with the drop, or non-correspondent and alternate at will, by regulation of the respective gearings, or else in imparting to a series of pounding arms or sleds, rotated by but not attached to the central shaft, or rotated by and attached to any convenient mechanism, a motion of intermittent rotation, together with a lifting and dropping motion.

They further consist of the combination, with a rotating shaft, of a series of lifting and dropping pounding-arms, adapted to be rotated, but not carried, by the shaft.

They further consist of a series of pounding-arms adapted to be either intermittently rotated or intermittently lifted and dropped, or both intermittently rotated and intermittently lifted and dropped, upon the platform of a drying apparatus.

They further consist of an automatically-discharging and overflow-regulating feed apparatus, adapted to be rotated over the platform of a drying apparatus.

They further consist of the combination of an overflow-pipe from the feed apparatus with a pan, to avoid waste of pulp material.

They further consist in the combination, with a steam-heated platform having an annular or circular opening through it, of a steam-heated annular trough located below such opening, to receive the dried material scraped from the platform, for the purpose of finally drying out of it any moisture which may possibly remain.

They further consist of the combination of a pan-sweeper with its operating feed apparatus, to discharge the annular trough.

They further consist of the combination of a pan-sweeper, driven by and in advance of a feed apparatus, and a steam-heated conveyer, for the final removal of dried material.

They further consist of the combination of the worm-gearing F 7, the cam 8, lever 9, eared collar 17, shaft E E', and frame-work H, to rotate intermittently, and intermittently lift and drop, a series of pounding-arms.

They further consist of the cylinder or frame-work A, in combination with the shaft E E', collar J, lever K, and trip-wheel M, to lift and drop a series of pounding-arms; the combination of an obliqued scraper with its operating-shaft and feed apparatus located behind it.

They consist, lastly, of a steam-heated platform having a central, or approximately central, annular opening or division through it for the passage of dried material into a trough below.

For the better information of the public, we will proceed to describe, in detail, the construction and arrangement of our improved apparatus with reference to that form of the same shown in Figs. 1, 2, 3, 4, and 5.

A is the inclosing case, supported, for convenience, upon columns or supports B; C, the cover-plate; C', a man-hole in the same; D, a half-double and perforated platform, all substantially as in our former patent. E is the hollow central rotating shaft, actuated to its intermittent rotation by a gear-wheel, F, and a worm, 7, of peculiar construction, hereinafter described. It is contracted below the platform into a shaft of less diameter, E', which rests in a stuffing-box upon a bed-plate, G, whereon the entire shaft rotates.

Carried by the shaft, at right angles to it, and directly above the platform, is an automatic-feeding apparatus, S, whereof hereafter.

Within the central shaft E, and bearing against it by rollers or other anti-friction devices, is a somewhat smaller cylinder or frame-work, H, contracted into and terminating in oblique prop-pieces P, that pass through radial slots in the annular plate Q, connecting the central shaft with its prolongation E', and terminate in turn upon and in a collar, I, close fitting around outside of and sliding upon the prolongation E'. J is a second distinct sliding collar around the cylinder E', upon which the inner cylinder H rests, through the medium of its prop-pieces and collar I. The lower face of the collar I and the upper face of the collar J are polished, for the better rotation of the one upon the other. Branching around the cylinder E', as shown in Fig. 5, or otherwise suitably constructed, is a lever of the second order, K, fulcrumed at L, upholding by pivotal connections O the sliding collar J. The lever is actuated by a trip-wheel, M, or other device, which, rotating, lifts it, and with it the frame-work H, which indirectly rests upon it, as before described, and allows it to fall at intervals, regular or otherwise. The inner cylinder or frame-work H carries at right angles and rigidly attached to it a series of radial pounding-arms, N, which pass through vertical slots in the shaft and extend over the platform. These arms are conveniently formed of wrought-iron tubing, with pounding-surfaces of metal brazed on, of shape as shown in Fig. 4, or of any other material in any other shape. They are heated by steam from a central supply-pipe R within the shaft E, and their number and proximity may be varied and regulated at will. S is the automatic-feed apparatus, shown in perspective in Fig. 2, and constructed as follows: T is a frame or bracket, bolted or otherwise rigidly secured to and at right angles with the shaft E. Set in bearings upon cross-pieces of this bracket are a pair of truncated conical rollers, V V', of the width of the double portion of the platform, whose inclination and dimensions are regulated by the diameter of their bases, which is fitly twelve inches, and by the fact that the lateral bounding-lines of horizontal planes cutting their axes would be, if extended to the center of the shaft E, radii of the inclosing case of the drier. They are set so as to almost come in contact. The foremost roller in the direction of the rotation of the shaft carries upon its base a toothed wheel, U, engaging with a circular rack, W, upon the inside of the inclosing case, by which it is rotated inward. Both rollers are connected at their smaller ends by toothed wheels X X, set upon them so that the aforesaid inward rotation of the foremost roller imparts a contrary motion to the other, both in consequence turning inward toward one another. Supported upon the bracket T above these rollers, and of their width, is a hopper, Z, to hold and feed the pulp between them. Upon the outside of both rollers are balanced scrapers Y, set to bear against, and, bearing, clean off onto the platform any pulp which may cling to the rollers.

The apparatus is fed with material to be dried by a pipe, b, passing through the shaft E and into the hopper from a supply-pan, a, located on the top of the shaft and pumped full of wet material from the stock-cistern. There is a second overflow-pipe, d, near the top of the hopper, passing into the shaft, and so arranged as to carry off into an annular stationary pan, c, over which it opens, and which connects with the stock-cistern, all excess of material fed into the hopper beyond its capacity for discharge upon the platform, rendering the apparatus self-regulating. g is a scraper, carried in immediate advance of the feed apparatus upon a bracket from the shaft E, so angled as to scrape the dried material through the openings in the single portion of the platform, whence it falls upon the steam-heated trough or drying-pan f, of annular form, where it remains until finally removed, the same being conveniently effected by a pan-sweeper attached to the shaft, and arranged to scrape the material into an opening in the trough connected with any suitable conveyer.

In Figs. 6 and 7 a modified form of our improved apparatus is shown of the greatest drying capacity. It is represented as resting upon joists 15 over a circular opening in a floor or staging. The platform is divided centrally into two annular compartments, 1 2, leaving an annular opening, 21, between, beneath and forming the bottom to which is the steam-heated trough or pan 3, having a large pipe or other opening, 18, through it, leading into a steam-heated spiral or other conveyer, 14. The feed apparatus is centrally divided into two parts, $S^2$ and $S^1$, the shafts of the rollers, however, continuing across, and the hoppers being connected by a gutter, 16, omitted for clearer illustration in the plan view, Fig. 7. The stationary overflow-pan $c$ in this arrangement of parts is outside of the central shaft.

Depending from the feed apparatus, or preferably from the arm in immediate advance of the same, is the pan-sweeper 13, of the form of a brush or scraper, and of the depth and width of the opening 21 and the annular trough 3, acting to discharge the trough of its dried contents into the pipe 18 leading into the conveyer 14, by the latter of which the material is finally removed. We find it convenient at times to employ more than one pipe and conveyer, so as to discharge at different points.

The central shaft rests and turns in a bearing, 12, supported, from the platform, upon the brackets 11, the entire operating mechanism being applied from above. The shaft E carries a gear-wheel, F, as before; but the lever 9, which fulcrums at 10, upon a support cast upon the cover-plate, branches around the inner frame-work H, and upholds a collar, 17, provided with trunnions or ears resting upon both sides of the lever, which, in turn, upholds, through the medium of the flange 19, the inner frame-work H; prop-pieces P connect a second frame-work, H', below, which carries the pounding-arms. The free extremity of the lever rests upon a cam, 8, on the same shaft that carries the worm-wheel 7, which actuates the gear-wheel of the shaft.

Figure 8:
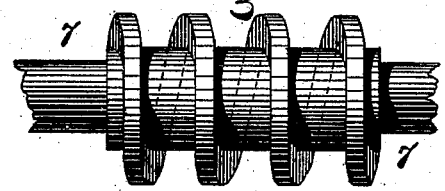

The worm 7 is of irregular construction, the threads being perfectly straight for any given sector of its shank, as shown in Fig. 8, the effect of which is that the gear-wheel and shaft are not rotated, but remain at rest when the straight portion of the worm-threads engage with the leaves of the gear-wheel, and only move when the oblique portions of the thread are in contact. From this structure of parts it will be readily comprehended that the lift and drop can be alternated or made correspondent with the stop-in-rotation at will by altering the position of the cam upon its shaft, a matter of keying or unkeying alone. In this form of drier a duplex scraper, $g'$ $g''$, in advance of the feed is required, convergently angled to scrape to the center from both sides and into the central trough.

Having thus described the construction of our improved apparatus, its method of operation is as follows: With reference to the apparatus shown in Fig. 1, motion is first imparted to the worm-gearing F 7 and trip-wheel M, by the first of which the shaft E is intermittently rotated, and together with it the inner cylinder H, which turns upon the collar J, while, by the latter, a lifting and dropping motion is imparted to the cylinder H, and, consequently, to the pounding-arms N, which it carries. The material to be dried having been pumped up from the stock-cistern or mixing-tub into the pan $a$, flows through the pipe $b$ into the feeding apparatus, and by it is spread evenly and continuously upon the platform, upon which all moisture is thoroughly dried out of it by the heat of platform and pounding-arms, in connection with the dragging or stationary weight and striking force of the arms. The scraper finally cleans the material dried as above through the perforated interior portion of the platform, causing it to fall upon the drying-pan $f$, where any moisture by chance remaining in it is effectually dried out prior to its removal by the pan-sweeper.

The apparatus may be made with more than one platform, and the details of mere mechanical construction modified at will.

The central shaft itself may carry the pounding-arms, and may itself be lifted and allowed to fall, in which case the scraper would be constructed with a compressible and a self-expanding edge, so that its edge should always bear upon the platform whatever the position of the shaft, and by such arrangement the inner cylinder be altogether dispensed with.

The relation of the worm-gearing to the trip-wheel in speed of rotation, and the construction of the trip-wheel itself, may be regulated by the nature of the material to be dried, as it will be of advantage in certain cases to allow the pounding-arms to drag upon the platform to some extent between each lift and fall.

The method of operation of the apparatus shown in Fig. 6 is identical with that shown in Fig. 1, save that all motive power is applied through the pulley 20 from above, and the material swept into the central trough, instead of through the openings around the shaft.

Having thus described our invention, we claim and desire to secure by Letters Patent of the United States—

1. In a drying apparatus, the combination of an intermittently-rotating shaft and a series of pounding arms or sleds, substantially as described.

2. In a drying apparatus, the combination of an intermittently lifting and dropping shaft and a series of pounding arms or sleds, substantially as described.

3. In a drying apparatus, the combination of a both intermittently-rotating and intermittently lifting and dropping shaft and a series of pounding arms or sleds, substantially as described.

4. In a drying apparatus, the combination, with a rotating shaft, E, of a series of lifting and dropping pounding-arms, N, adapted to be rotated but not carried by the shaft, substantially as described.

5. A series of rotating pounding-arms, adapted to be lifted and dropped upon the platform, substantially as and for the purpose specified.

6. The automatically-discharging and overflow-regulating feed apparatus S, adapted to be rotated over the platform of a drying apparatus, substantially as described.

7. The combination of the overflow-pipe $d$, from the feed apparatus S, with the pan $c$, to avoid waste, as specified.

8. In combination with a steam-heated platform, having an annular or circular opening through it, a steam-heated annular trough, located below such opening, to receive the dried material scraped from the platform, for the purpose specified.

9. The combination of a pan-sweeper, 13, with its operating feed apparatus S, substantially as and for the purpose described.

10. The combination of the pan-sweeper 13, driven by and in advance of the feed apparatus, and the steam-heated conveyer 14, for the final removal of dried material, substantially as described.

11. The combination of the worm-gearing F 7, cam 8, lever 9, eared collar 17, shaft E E′, and frame-work H, the whole forming a convenient mechanism for intermittently rotating and intermittently lifting and dropping a series of pounding-arms, substantially for the ends hereinbefore set forth.

12. The cylinder or frame-work H, substantially as specified, in combination with the shaft E E′, collar J, lever K, and trip-wheel M, to lift and drop a series of pounding-arms, substantially as described.

13. The combination of an obliqued scraper, $g$ $g'$ $g''$, with its operating-shaft E, and feed apparatus S, located behind it, substantially as described.

14. In a drying apparatus, steam-heated platform 1 2, having an annular opening or division, 21, through it, for the purpose specified.

In testimony whereof we have hereunto signed our names in the presence of subscribing witnesses.

THOMAS S. HARRISON. [L. S.]
THOS. H. SAVERY. [L. S.]

Witnesses to the signature of THOMAS S. HARRISON:
W. E. ARMSTRONG,
WM. M. PENNINGTON.

Witnesses to the signature of THOMAS H. SAVERY:
J. V. SHEPPEY,
SAML. MURPHY.